(12) United States Patent
Kimpara

(10) Patent No.: US 12,344,363 B2
(45) Date of Patent: Jul. 1, 2025

(54) HYBRID SHIP PROPULSION MACHINE

(71) Applicant: SUZUKI MOTOR CORPORATION, Hamamatsu (JP)

(72) Inventor: Masatoshi Kimpara, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 521 days.

(21) Appl. No.: 17/939,498

(22) Filed: Sep. 7, 2022

(65) Prior Publication Data

US 2023/0087983 A1    Mar. 23, 2023

(30) Foreign Application Priority Data

Sep. 17, 2021    (JP) ................. 2021-152542

(51) Int. Cl.
    *B63H 21/20*      (2006.01)
    *B63H 11/08*      (2006.01)
    *B63H 20/32*      (2006.01)

(52) U.S. Cl.
    CPC ............ *B63H 21/20* (2013.01); *B63H 11/08* (2013.01); *B63H 20/32* (2013.01); *B63H 2021/205* (2013.01)

(58) Field of Classification Search
    CPC ........ B63H 21/20; B63H 11/08; B63H 20/32; B63H 2021/205; B63H 2020/006; B63H 20/007
    See application file for complete search history.

(56) References Cited

U.S. PATENT DOCUMENTS

| | | | | |
|---|---|---|---|---|
| 3,139,853 A | * | 7/1964 | McCarthy | B63H 20/007 440/66 |
| 2023/0086934 A1 | * | 3/2023 | Kimpara | B63H 11/08 440/39 |
| 2023/0090635 A1 | * | 3/2023 | Kimpara | B63H 20/007 440/3 |
| 2023/0112935 A1 | * | 4/2023 | Rollinger | B63H 20/007 440/6 |

FOREIGN PATENT DOCUMENTS

| | | | | |
|---|---|---|---|---|
| JP | 2007-8329 A | | 1/2007 | |
| WO | WO-2014150752 A2 | * | 9/2014 | ........... B63H 20/007 |

\* cited by examiner

*Primary Examiner* — Andrew Polay
(74) *Attorney, Agent, or Firm* — Stein IP LLC

(57) ABSTRACT

A hybrid ship propulsion machine includes an internal-combustion-drive propulsion part and an electric propulsion part. The electric propulsion part is attached to a first housing part of the internal-combustion-drive propulsion part, and is disposed at a position higher than an anti-cavitation plate of the internal-combustion-drive propulsion part such that a suction port of the electric propulsion part sinks below a water surface during low-speed movement, which is not a planing state of a ship, and the suction port comes out of the water surface during planing of the ship.

7 Claims, 7 Drawing Sheets

HYBRID SHIP PROPULSION MACHINE

CROSS-REFERENCE TO RELATED APPLICATIONS

The disclosure of Japanese Patent Application No. 2021-152542 filed on Sep. 17, 2021, including specification, drawings and claims is incorporated herein by reference in its entirety

BACKGROUND

The present invention relates to a hybrid ship propulsion machine including an internal-combustion-drive propulsion part using an internal combustion engine as a power source and an electric propulsion part using an electric motor as a power source.

In the related art, a ship propulsion machine using an internal combustion engine as a power source have been generally used, but in recent years, a ship propulsion machine using an electric motor as a power source have also been widely used.

When the internal combustion engine and the electric motor are compared with each other, it can be said that the internal combustion engine is superior to the electric motor in terms of the capability to make the ship sail at a high speed over a long period of time. Considering that a large-capacity battery is required to rotate the electric motor at a high speed over a long period of time, the internal combustion engine is currently more practical. On the other hand, it can be said that the electric motor capable of generating a high torque from a low rotation speed range is superior to the internal combustion engine in terms of the capability of moving the ship at an extremely low speed. In addition, it can be said that the electric motor is superior to the internal combustion engine in terms of the quietness during low-speed sailing. In the internal combustion engine, a large driving sound during low-speed sailing may become harsh.

In addition, there is a method of using both an internal combustion engine and an electric motor as a power source of a ship propulsion machine. According to this method, the shortage of the capability of the internal combustion engine in a low speed range can be compensated by the electric motor while utilizing the high capability of the internal combustion engine in a high speed range. In addition, according to this method, it is possible to prevent noise during low-speed sailing.

As the method of using both the internal combustion engine and the electric motor as the power source of the ship propulsion machine, there are the following two methods.

The first method is a method in which an internal-combustion-driven ship propulsion machine using only an internal combustion engine as a power source and an electric ship propulsion machine using only an electric motor as a power source are separately prepared, and these two types of ship propulsion machines are provided in a ship. For example, this corresponds to a case where an internal-combustion-driven outboard motor and an electric outboard motor are multi-mounted on one ship. The second method is a method in which a hybrid ship propulsion machine including both an internal combustion engine and an electric motor as power sources is provided in a ship.

Patent Literature 1 below describes an outboard motor including both an internal combustion engine and an electric motor as power sources. The outboard motor has an internal combustion engine and an electric motor built-in, and has a structure in which power of the internal combustion engine and power of the electric motor are transmitted to a common propeller via a common main drive shaft and a common propeller shaft. FIG. 2 of Patent Literature 1 shows a mechanism for transmitting the power of the internal combustion engine and the power of the electric motor to the main drive shaft, and this mechanism is provided with an automatic centrifugal clutch and a large number of gears. Patent Literature 1: JP-A-2007-8329

SUMMARY

The present invention provides a hybrid ship propulsion machine including an internal-combustion-drive propulsion part configured to generate a propulsive force of a ship by an internal combustion engine and an electric propulsion part configured to generate a propulsive force of the ship by an electric motor. The internal-combustion-drive propulsion part includes the internal combustion engine, a propeller shaft configured to be rotated by power output from the internal combustion engine, a power transmission mechanism configured to transmit the power output from the internal combustion engine to the propeller shaft, a first housing part housing the power transmission mechanism and the propeller shaft, a propeller attached to the propeller shaft, and an anti-cavitation plate provided in the first housing part and is disposed above the propeller. The electric propulsion part includes a duct in which a suction port through which water is sucked is provided on one end side and a discharge port through which water sucked from the suction port is discharged is provided on the other end side, the electric motor, a second housing part attached to the duct and houses the electric motor, an impeller provided in the duct and is configured to generate a jet, and an impeller shaft configured to transmit power output from the electric motor to the impeller to rotate the impeller. The electric propulsion part is attached to the first housing part, and is disposed at a position higher than the anti-cavitation plate such that the suction port sinks below a water surface during low-speed movement, which is not a planing state of the ship, and the suction port comes out of the water surface during planing of the ship.

DESCRIPTION OF EMBODIMENTS

Figure 1:
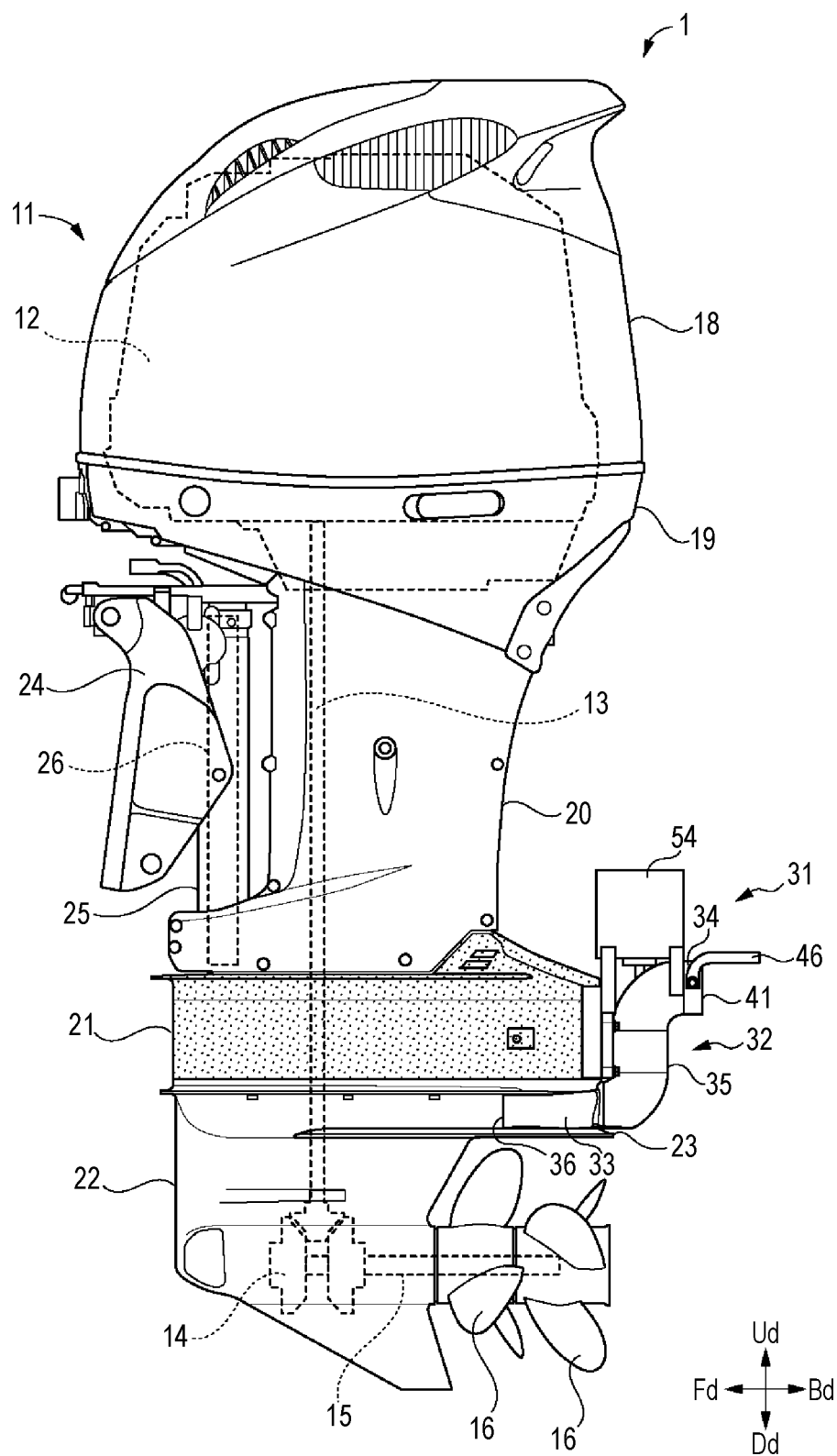
FIG. 1 is an explanatory view showing a hybrid outboard motor, which is an embodiment of a hybrid ship propulsion machine of the present invention, as viewed from the left side thereof.

According to the method using both the internal combustion engine and the electric motor as the power source of the ship propulsion machine, as described above, it is possible to compensate for the disadvantage of the internal combustion engine by the electric motor while utilizing the advantage of the internal combustion engine, and it is possible to improve the sailing performance of the ship in a wide range of speed ranges.

However, there are the following problems in the method of providing the internal-combustion-driven ship propulsion machine using only the internal combustion engine as the power source and the electric ship propulsion machine using only the electric motor as the power source in a ship.

In order to provide the internal-combustion-driven ship propulsion machine and the electric ship propulsion machine, a certain large space is required. Therefore, it is difficult to provide the internal-combustion-driven ship propulsion machine and the electric ship propulsion machine in a small ship in which the space of the stem portion is small. In addition, in a medium-sized ship, for example, when a plurality of internal-combustion-driven outboard motors have already been multi-mounted on the ship, it may be difficult to further mount an electric outboard motor on the ship.

In addition, in the method of providing the hybrid ship propulsion machine, a mechanism for transmitting the power of the internal combustion engine and the power of the electric motor to a common drive shaft is complicated as in the outboard motor described in Patent Literature 1, and there is a problem that the manufacturing cost is increased.

Therefore, the inventor of the present application has conceived a method of externally attaching an electric jet propulsion device, which includes a duct, an electric motor, and an impeller provided in the duct and connected to an output shaft of the electric motor, to an internal-combustion-driven ship propulsion machine using only an internal combustion engine as a power source. According to this method, since the internal-combustion-driven ship propulsion machine to which the electric jet propulsion device is externally attached is provided in the ship, the ship propulsion machine directly provided in the ship is only the internal-combustion-driven ship propulsion machine. Therefore, even in a small ship in which the space of the stem portion is small and also in a ship in which a plurality of internal-combustion-driven outboard motors have already been multi-mounted, an internal-combustion-driven ship propulsion machine to which an electric jet propulsion device is externally attached can be easily provided, and a propulsive force by internal combustion driving and a propulsive force by electric driving can be obtained. In addition, according to this method, since the electric jet propulsion device is externally attached to the internal-combustion-driven ship propulsion machine, the propeller rotated by the power of the internal combustion engine and the impeller rotated by the power of the electric motor are separate from each other, and the mechanism for transmitting the power from the internal combustion engine to the propeller and the mechanism for transmitting the power from the electric motor to the impeller are separate from each other. Therefore, in order to obtain the propulsive force by the internal combustion engine and the propulsive force by the electric motor, it is not necessary to provide a complicated mechanism for transmitting the power of the internal combustion engine and the power of the electric motor to the common drive shaft in the ship propulsion machine.

However, the method of externally attaching the electric jet propulsion device to the internal-combustion-driven ship propulsion machine has the following problems. Most of the electric jet propulsion device externally attached to the internal-combustion-driven ship propulsion machine sinks below a water surface. Therefore, during movement of the ship, water hits the electric jet propulsion device, which serves as resistance to the movement of the ship. The resistance increases during planing of the ship, and there is a concern that the sailing performance of the ship during planing may be reduced.

The present invention has been made in view of, for example, the above-described problems, and an object of the present invention is to provide a hybrid ship propulsion machine capable of preventing complication of an internal structure and preventing a decrease in a sailing performance of a ship during planing.

According to the present invention, it is possible to prevent an internal structure of a hybrid ship propulsion machine from being complicated, and it is possible to prevent a decrease in a sailing performance of a ship during planing.

A hybrid ship propulsion machine according to an embodiment of the present invention includes an internal-combustion-drive propulsion part that generates a propulsive force of a ship by an internal combustion engine, and an electric jet propulsion part that generates a propulsive force of the ship by an electric motor.

The internal-combustion-drive propulsion part includes: the internal combustion engine; a propeller shaft that is rotated by power output from the internal combustion engine; a power transmission mechanism configured to transmit the power output from the internal combustion engine to the propeller shaft; a first housing part that houses the power transmission mechanism and the propeller shaft; a propeller that is attached to the propeller shaft; and an anti-cavitation plate that is provided in the first housing part and is disposed above the propeller.

The electric jet propulsion part includes: a duct in which a suction port through which water is sucked is provided on one end side and a discharge port through which water sucked from the suction port is discharged is provided on the other end side; the electric motor; a second housing part that is attached to the duct and houses the electric motor; an impeller that is provided in the duct and is configured to generate a jet; and an impeller shaft that transmits power output from the electric motor to the impeller to rotate the impeller.

In addition, the electric jet propulsion part is attached to the first housing part, and is disposed at a position higher than the anti-cavitation plate such that the suction port of the duct sinks below a water surface during low-speed movement, which is not a planing state of the ship, and the suction port of the duct comes out of the water surface during planing of the ship.

By setting the attachment position of the electric jet propulsion part in this manner, it is possible to reduce the resistance generated by water hitting the electric jet propulsion part during planing of the ship, and it is possible to prevent the sailing performance of the ship during planing from being lowered by the resistance.

In addition, the hybrid ship propulsion machine of the present embodiment can be implemented by externally attaching the electric jet propulsion part different from the internal-combustion-drive propulsion part to the first housing part of the internal-combustion-drive propulsion part. Accordingly, it is possible to generate the propulsive force by the internal combustion engine and the propulsive force by the electric motor without using a complicated mechanism that transmits the power of the internal combustion engine and the power of the electric motor to a common drive shaft. Therefore, it is possible to prevent the internal structure of the hybrid ship propulsion machine from being complicated.

Embodiment

Hereinafter, a hybrid outboard motor according to an embodiment of a hybrid ship propulsion machine of the present invention will be described with reference to the drawings. In the embodiment, when front (Fd), rear (Bd), left (Ld), right (Rd), upper (Ud), and lower (Dd) directions follow arrows drawn at the lower right portion in FIGS. 1 to 6, 8 and 9.

(Hybrid Outboard Motor)

Figure 2:
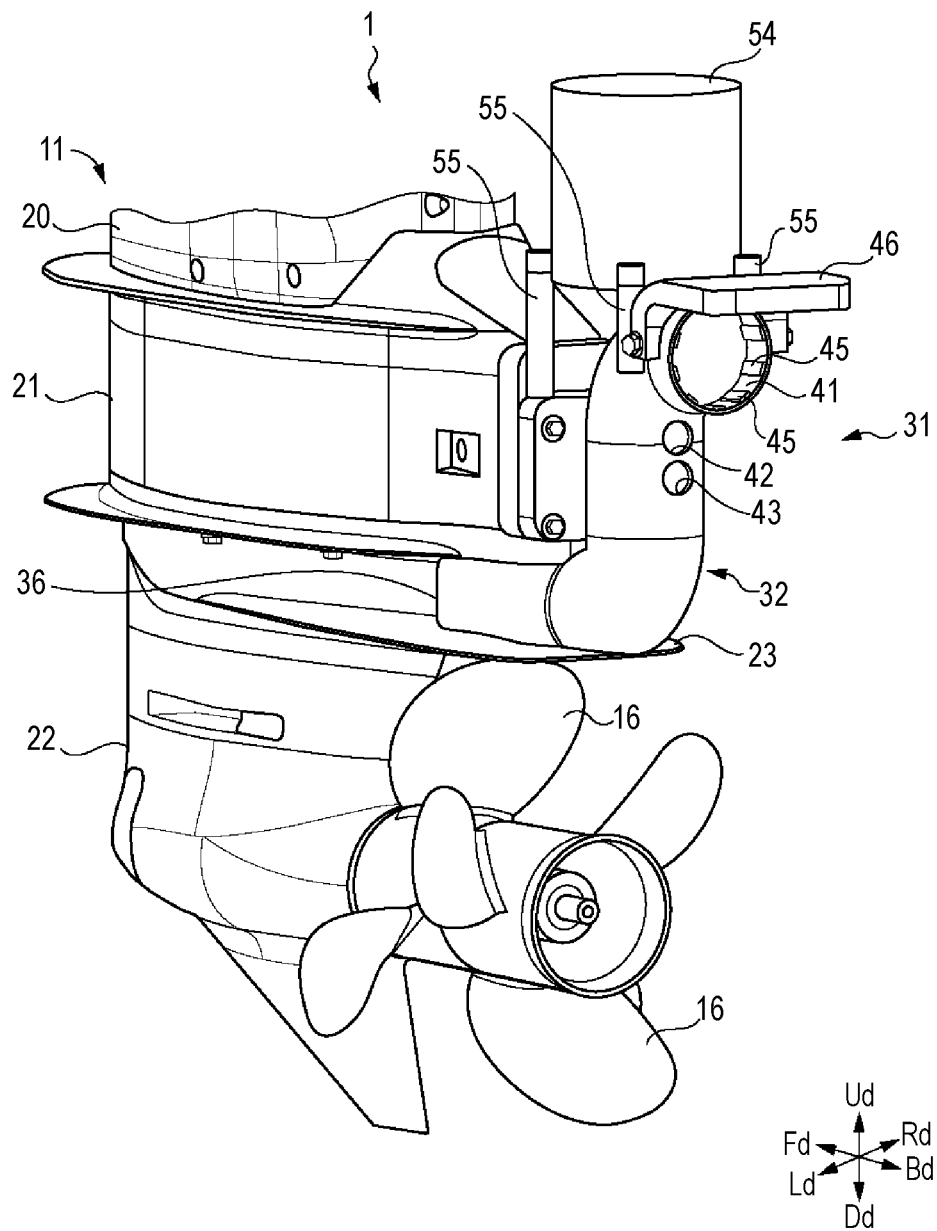
FIG. 2 is a perspective view of a lower portion of the hybrid outboard motor according to the embodiment of the present invention, as viewed from the upper left rear side thereof.

FIG. 1 shows a hybrid outboard motor 1 according to an embodiment of the present invention as viewed from the left side thereof. FIG. 2 shows a lower portion of the hybrid outboard motor 1 as viewed from the upper left rear side.

The hybrid outboard motor 1 is an outboard motor that uses both an internal combustion engine and an electric motor as power sources. As shown in FIG. 1, the hybrid outboard motor 1 includes an internal-combustion-drive propulsion part 11 and an electric propulsion part 31. The internal-combustion-drive propulsion part 11 is a portion that generates a propulsive force of a ship by the internal combustion engine. On the other hand, the electric propulsion part 31 is a portion that generates a propulsive force of the ship by the electric motor. The electric propulsion part 31 has a configuration of a jet propulsion device that generates a jet to obtain a propulsive force. As shown in FIG. 2, the electric propulsion part 31 is attached (externally attached) to a portion of the internal-combustion-drive propulsion part 11 located above an anti-cavitation plate 23 from the outside of the internal-combustion-drive propulsion part 11. Hereinafter, the hybrid outboard motor 1 is simply referred to as an "outboard motor 1". The electric propulsion part 31 is a specific example of an "electric jet propulsion part".

(Internal-Combustion-Drive Propulsion Part)

The internal-combustion-drive propulsion part 11 includes an internal combustion engine 12 provided in an upper portion of the outboard motor 1, a drive shaft 13 extending in an upper-lower direction in an intermediate portion in the upper-lower direction of the outboard motor 1, a gear mechanism 14 provided in a lower portion of the outboard motor 1, a propeller shaft 15 provided in the lower portion of the outboard motor 1 and extending in a front-rear direction, and a propeller 16 attached to a rear end side portion of the propeller shaft 15.

The internal combustion engine 12 is, for example, a four-stroke engine using gasoline as fuel. Power output from the internal combustion engine 12 is transmitted to the propeller shaft 15 via the drive shaft 13 and the gear mechanism 14. Accordingly, the propeller shaft 15 rotates based on the power of the internal combustion engine 12. The propeller 16 rotates together with the propeller shaft 15 to generate a propulsive force of the ship. In addition, the gear mechanism 14 includes a clutch (not show-n), and by the operation of the clutch, it is possible to switch whether to transmit the power of the internal combustion engine 12 to the propeller shaft 15, and to switch a rotation direction of the propeller shaft 15.

In addition, the internal-combustion-drive propulsion part 11 includes a top cowl 18, a bottom cowl 19, an upper case 20, a middle case 21, and a gear case 22 (lower case). For convenience of understanding, in the middle case 21 in FIGS. 1 and 5B, portions exposed to the outside are marked with dot patterns.

The top cowl 18 and the bottom cowl 19 cover the internal combustion engine 12. The drive shaft 13 is housed in the upper case 20 and the middle case 21. A front end side portion of the gear mechanism 14 and the propeller shaft 15 is housed in the gear case 22. In addition, the anti-cavitation plate 23 that prevents air from being sucked into the propeller 16 is provided above the propeller 16 in an upper side portion of a rear portion of the gear case 22. In addition, a clamp bracket 24 for attaching and fixing the outboard motor 1 to a transom of the ship is provided in front of the upper case 20. A swivel bracket 25 is attached to the clamp bracket 24, and the outboard motor 1 is rotatably supported by the swivel bracket 25 via a steering shaft 26 such that the orientation of the outboard motor 1 in a left-right direction can be changed.

The drive shaft 13 and the gear mechanism 14 are specific examples of a "power transmission mechanism". In addition, the upper case 20, the middle case 21, and the gear case 22 are specific examples of a "first housing part".

(Electric Propulsion Part)

Figure 3:
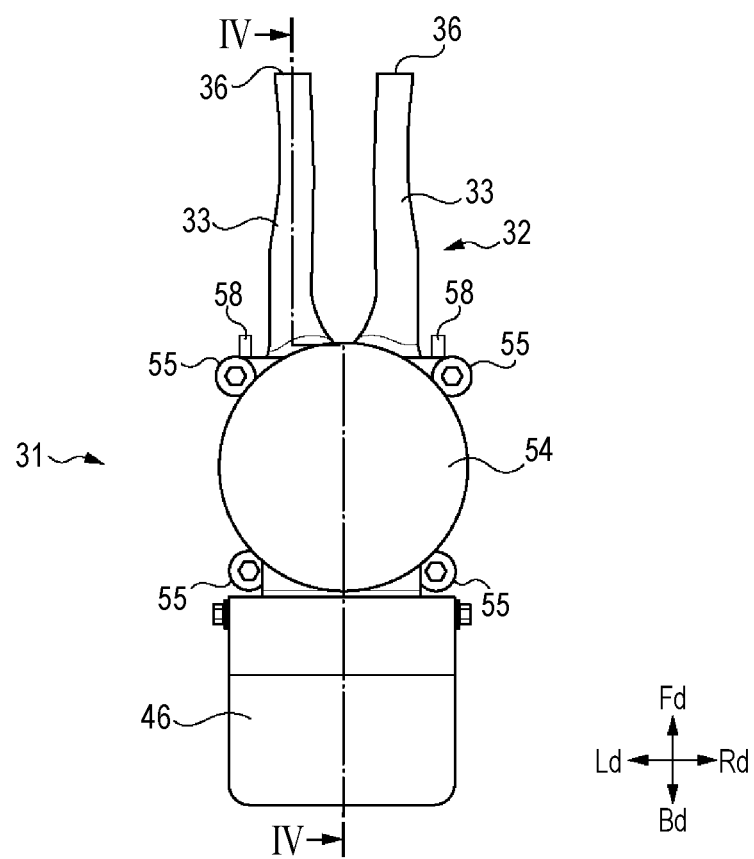
FIG. 3 is an external view of an electric propulsion part of the hybrid outboard motor according to the embodiment of the present invention, as viewed from above.
Figure 4:
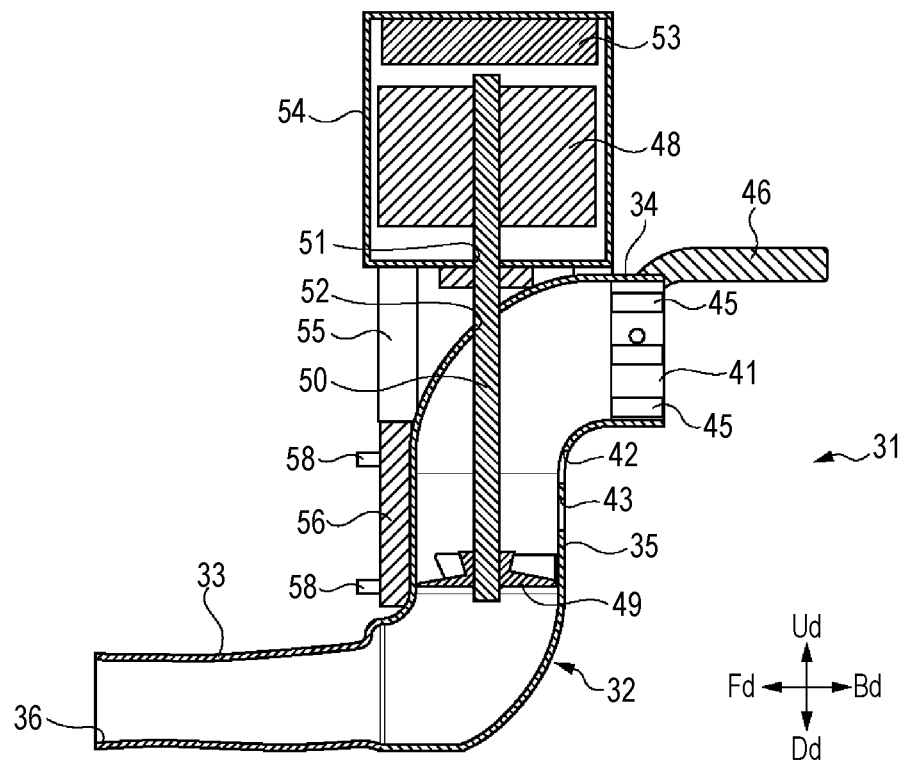
FIG. 4 is a cross-sectional view showing a cross section of the electric propulsion part taken along a cutting line IV-IV in FIG. 3, as viewed from the left.

FIG. 3 shows the electric propulsion part 31 as viewed from above. FIG. 4 shows a cross section of the electric propulsion part 31 taken along a cutting line IV-IV in FIG. 3, as viewed from the left.

As shown in FIGS. 3 and 4, the electric propulsion part 31 includes a duct 32, an electric motor 48, an impeller 49, an impeller shaft 50, an inverter 53, and a housing case 54.

The duct 32 is formed of, for example, a metal material in a substantially S-shaped tube shape. The duct 32 includes two suction portions 33 located on a front end side of the duct 32, a discharge portion 34 located on a rear end side of the duct 32, and an intermediate portion 35 located between each suction portion 33 and the discharge portion 34 in the duct 32.

As shown in FIG. 3, the two suction portions 33 are arranged in the left-right direction, and each suction portion 33 extends in the front-rear direction. In addition, a suction port 36 is provided on a front end side of each suction portion 33, and each suction port 36 faces forward. In addition, as can be seen from FIG. 4, an inner diameter of each suction portion 33 is smaller than an inner diameter of the intermediate portion 35 and an inner diameter of the discharge portion 34. In addition, a diameter of each suction port 36 is smaller than a diameter of a first discharge port 41.

The intermediate portion 35 is single and extends in the upper-lower direction. Each of the two suction portions 33 is connected to a lower end side of the intermediate portion 35. In addition, a portion from the rear end side of the two suction portions 33 to the lower end side of the intermediate portion 35 is gently curved. In addition, the discharge portion 34 is connected to an upper end side of the intermediate portion 35. In addition, a portion from the upper end side of the intermediate portion 35 to the front end side of the discharge portion 34 is gently curved.

The discharge portion 34 is single and extends in the front-rear direction. The first discharge port 41 is provided on the rear end side of the discharge portion 34, and the first discharge port 41 faces rearward. In addition, as shown in FIG. 2, a plurality of fins 45 are provided at predetermined intervals along the entire circumference of an inner peripheral portion of the first discharge port 41.

In addition, a plate member 46 is provided above the first discharge port 41. The plate member 46 has a function of guiding water into the first discharge port 41 when the impeller 49 is reversely rotated to generate a jet in a reverse direction (a direction from the first discharge port 41 toward each suction port 36). The plate member 46 is attached to the discharge portion 34.

In addition, the duct 32 includes a second discharge port 42 and a third discharge port 43 in addition to the first discharge port 41. The second discharge port 42 and the third discharge port 43 are disposed in a rear side portion on a peripheral wall portion of the intermediate portion 35. In addition, the second discharge port 42 and the third discharge port 43 face rearward, respectively. In addition, the second discharge port 42 and the third discharge port 43 are arranged in the upper-lower direction. The second discharge port 42 is disposed below the first discharge port 41, and the third discharge port 43 is disposed below the second discharge port 42. In addition, the diameter of each of the second discharge port 42 and the third discharge port 43 is smaller than the diameter of the first discharge port 41.

As shown in FIG. 4, the electric motor 48 is disposed above the duct 32. The electric motor 48 is, for example, a brushless motor. The electric motor 48 is housed in the housing case 54. The housing case 54 has, for example, a cylindrical outer shape, and has a complete waterproof structure. In addition, the housing case 54 is attached to the duct 32. Specifically, as shown in FIG. 2, a front portion of the housing case 54 is fixed to an upper portion of an attachment bracket 56 fixed to the intermediate portion 35 of the duct 32 via two support portions 55, and a rear portion of the housing case 54 is fixed to an outer peripheral side of a rear portion of the discharge portion 34 of the duct 32 via other two support portions 55. The housing case 54 is a specific example of a "second housing part".

The impeller 49 is rotated by the power of the electric motor 48 to generate a jet. As shown in FIG. 4, the impeller 49 is provided in the duct 32. The impeller 49 is disposed in a region below the third discharge port 43 in the intermediate portion 35 of the duct 32.

The impeller shaft 50 transmits the power output from the electric motor 48 to the impeller 49 to rotate the impeller 49. The impeller shaft 50 extends in the upper-lower direction, an upper end side of the impeller shaft 50 is connected to an output shaft of the electric motor 48, and the impeller 49 is attached to a lower end side of the impeller shaft 50. In addition, an upper end side portion of the impeller shaft 50 is inserted into the housing case 54 through an insertion hole 51 formed in a lower surface of the housing case 54. In addition, a lower end side portion of the impeller shaft 50 is inserted into the duct 32 through an insertion hole 52 formed in an upper portion of the peripheral wall portion of the intermediate portion 35 of the duct 32. In addition, a gap between the insertion hole 51 and the impeller shaft 50 is sealed to prevent water from entering the housing case 54.

The inverter 53 is a circuit that controls driving of the electric motor 48. The inverter 53 is housed in the housing case 54.

The electric propulsion part 31 operates as follows. When the electric motor 48 is driven and the impeller shaft 50 and the impeller 49 are normally rotated in a state where each suction port 36 sinks below the water surface, a jet in a normal direction (a direction from each suction port 36 toward the first discharge port 41) is generated. That is, water is sucked into the duct 32 from each suction port 36, and the water sucked into the duct 32 is discharged rearward from the first discharge port 41, the second discharge port 42, and the third discharge port 43. Accordingly, a propulsive force for moving the ship forward is generated. On the other hand, when the electric motor 48 is driven and the impeller shaft 50 and the impeller 49 are reversely rotated in a state where all or a part of the first discharge port 41 sinks below the water surface, a jet in the reverse direction (a direction from the first discharge port 41 toward each suction port 36) is generated. That is, water is sucked into the duct 32 from the first discharge port 41, the second discharge port 42, and the third discharge port 43, and the water sucked into the duct 32 is discharged forward from each suction port 36. Accordingly, a propulsive force for moving the ship backward is generated. When the jet in the reverse direction is generated, the water easily flows into the first discharge port 41 by the plate member 46.

(Arrangement of Electric Propulsion Part)

As shown in FIGS. 1 and 2, the electric propulsion part 31 is disposed behind a lower portion of the internal-combustion-drive propulsion part 11, and is attached to a rear portion of the middle case 21. In addition, the electric propulsion part 31 is located above the propeller 16 of the internal-combustion-drive propulsion part 11. In addition, the electric propulsion part 31 is disposed at a position higher than the anti-cavitation plate 23.

Specifically, the two suction portions 33 of the duct 32 are located above the anti-cavitation plate 23, and are disposed so as to sandwich an upper side rear portion of the gear case 22 from the left and right sides. In addition, the two suction ports 36 are located above the anti-cavitation plate 23, and are respectively disposed on the left side and the right side of the upper side rear portion of the gear case 22. In addition, the intermediate portion 35 and the discharge portion 34 of the duct 32 are located higher than the anti-cavitation plate 23, and are disposed at a center in the left-right direction on the rear side of the middle case 21. In addition, the first discharge port 41 is located higher than the anti-cavitation plate 23, and is disposed at a center in the left-right direction on the rear side of the upper portion of the middle case 21. In addition, the second discharge port 42 and the third discharge port 43 are located higher than the anti-cavitation plate 23, and are disposed at the center in the left-right direction on the rear side of the middle case 21. In addition, most of the housing case 54 is disposed at a position higher than the upper portion of the middle case 21.

Figure 5A:
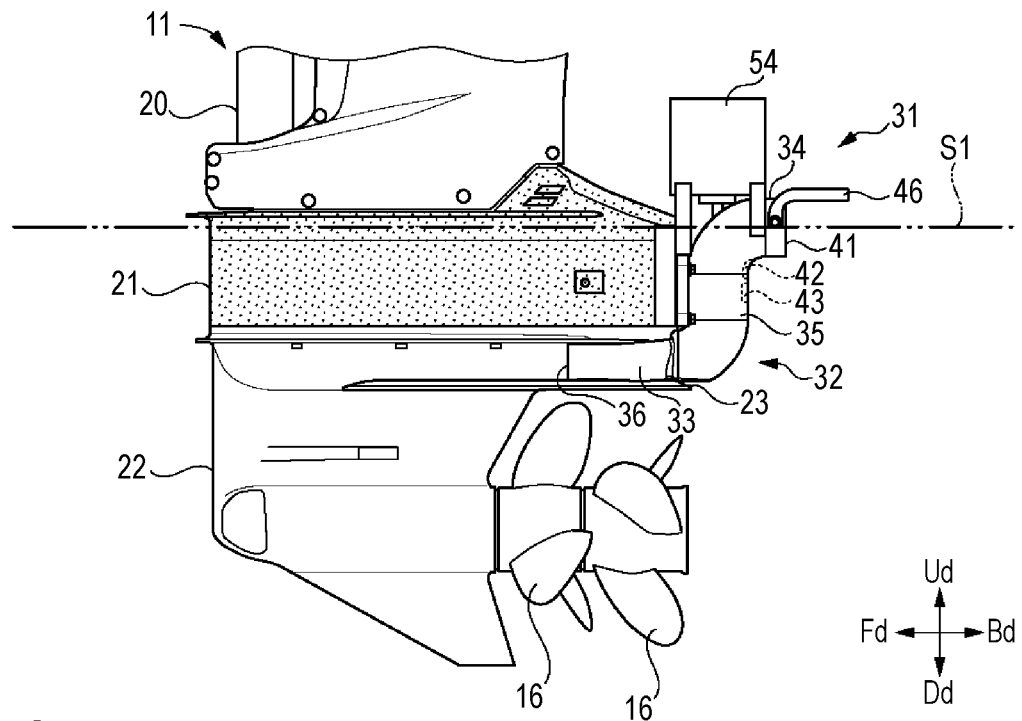
FIG. 5A shows a positional relationship between the hybrid outboard motor and the water surface during low-speed movement and is an explanatory view showing a positional relationship between the hybrid outboard motor according to the embodiment of the present invention and a water surface.
Figure 5B:
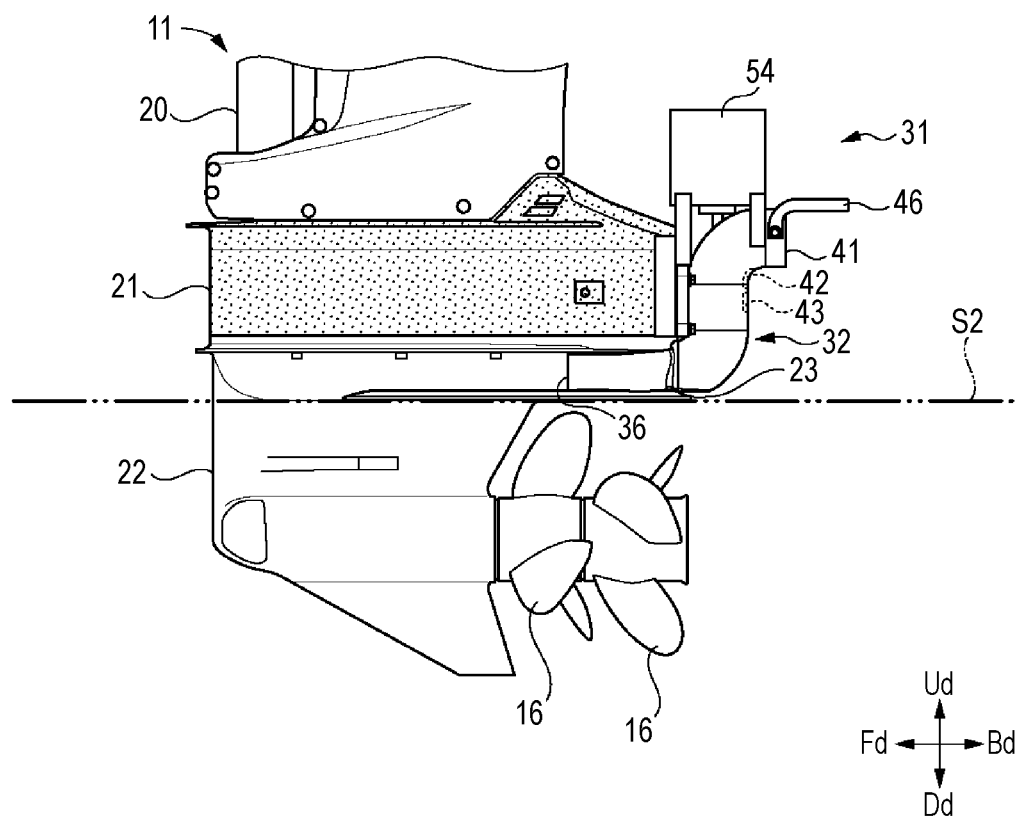
FIG. 5B shows a positional relationship between the hybrid outboard motor and the water surface during planing and is an explanatory view showing a positional relationship between the hybrid outboard motor according to the embodiment of the present invention and a water surface.

In addition, as shown in FIGS. 5A and 5B, the electric propulsion part 31 is disposed at a position where each suction port 36 sinks below the water surface during low-speed movement, which is not a planing state of the ship, and each suction port 36 comes out of the water surface during planing of the ship.

That is, a two-dot chain line S1 in FIG. 5A indicates a position of the water surface during low-speed movement which is not a planing state of the ship. During low-speed movement which is not a planing state of the ship, most of the portion of the middle case 21 that is exposed to the outside (the portion with a dot pattern in the drawing) and the entire gear case 22 sink below the water surface, and the anti-cavitation plate 23 also sinks below the water surface. In addition, during low-speed movement which is not a planing state of the ship, all or most of the duct 32 sinks below the water surface. Specifically, during low-speed movement which is not a planing state of the ship, in the duct 32, all of each suction portion 33, all of each suction port 36, all or most of the intermediate portion 35, all or a lower side portion of the discharge portion 34, and all or a lower side portion of the first discharge port 41 sink below the water surface. On the other hand, the housing case 54 comes out of the water surface.

During low-speed movement which is not a planing state of the ship, the electric motor 48 is driven and the impeller 49 is rotated in accordance with the steering of the ship by a user. During low-speed movement which is not a planing state of the ship, all of each suction port 36 and all or the lower side portion of the first discharge port 41 sink below the water surface, and therefore, a propulsive force can be applied to the ship by rotating the impeller 49.

On the other hand, a two-dot chain line S2 in FIG. 5B indicates a position of the water surface during planing of the ship. During planing of the ship, the ship and the outboard motor 1 float and the positions of the ship and the outboard motor 1 with respect to the water surface become higher than that during low-speed movement which is not a planing state of the ship. During planing of the ship, the position of the water surface becomes equivalent to the position of the anti-cavitation plate 23, and the entire middle case 21 and the upper portion of the gear case 22 (the portion above the anti-cavitation plate 23) come out of the water surface. In addition, during planing of the ship, all or most of the electric propulsion part 31 comes out of the water surface. Specifically, during planing of the ship, all or most of the duct 32 (all or most of each suction port 36 and all of the first discharge port 41) comes out of the water surface. Of course, the housing case 54 is exposed from the water surface.

During planing of the ship, the driving of the electric motor 48 is stopped, and the rotation of the impeller 49 is stopped. During planing of the ship, all or most of the electric propulsion part 31 comes out of the water surface, and therefore, it is possible to prevent resistance to the movement of the ship. That is, if all or most of the duct 32 sinks below the water surface during planing of the ship, the resistance generated by water hitting the duct 32 hinders the movement of the ship. In addition, when not only the duct 32 but also the housing case 54 sinks below the water surface during planing of the ship, the resistance increases, and the movement of the ship is further hindered. In the present embodiment, all or most of the electric propulsion part 31 comes out of the water surface during planing of the ship, and therefore, it is possible to prevent the generation of such resistance.

On the other hand, the housing case 54 is exposed from the water surface not only during planing of the ship but also during low-speed movement which is not a planing state of the ship. Accordingly, even during low-speed movement which is not a planing state of the ship, it is possible to prevent the resistance generated by the water hitting the housing case 54.

In addition, while the ship transitions from a low-speed movement state to a planing state, the positions of the ship and the outboard motor 1 with respect to the water surface gradually increase. During this time, the first discharge port 41 first comes out of the water surface, then the second discharge port 42 comes out of the water surface, and then the third discharge port 43 comes out of the water surface. In addition, the driving of the electric motor 48 is stopped after the third discharge port 43 comes out of the water surface. As a result, while the ship transitions from the low-speed movement state to the planing state, the propulsive force of the ship obtained by the electric propulsion part 31 gradually decreases. Accordingly, it is possible to prevent the propulsive force of the electric propulsion part 31 from significantly decreasing at once (suddenly falling) at one point in time during the transition of the ship from the low-speed movement state to the planing state, and it is possible to stabilize the sailing of the ship. Further, according to this method, the propulsive force of the electric propulsion part 31 can be gradually decreased without performing the control of gradually decreasing the rotation speed of the electric motor 48 while the ship transitions from the low-speed movement state to the planing state.

(Attachment of Electric Propulsion Part)

Figure 6:
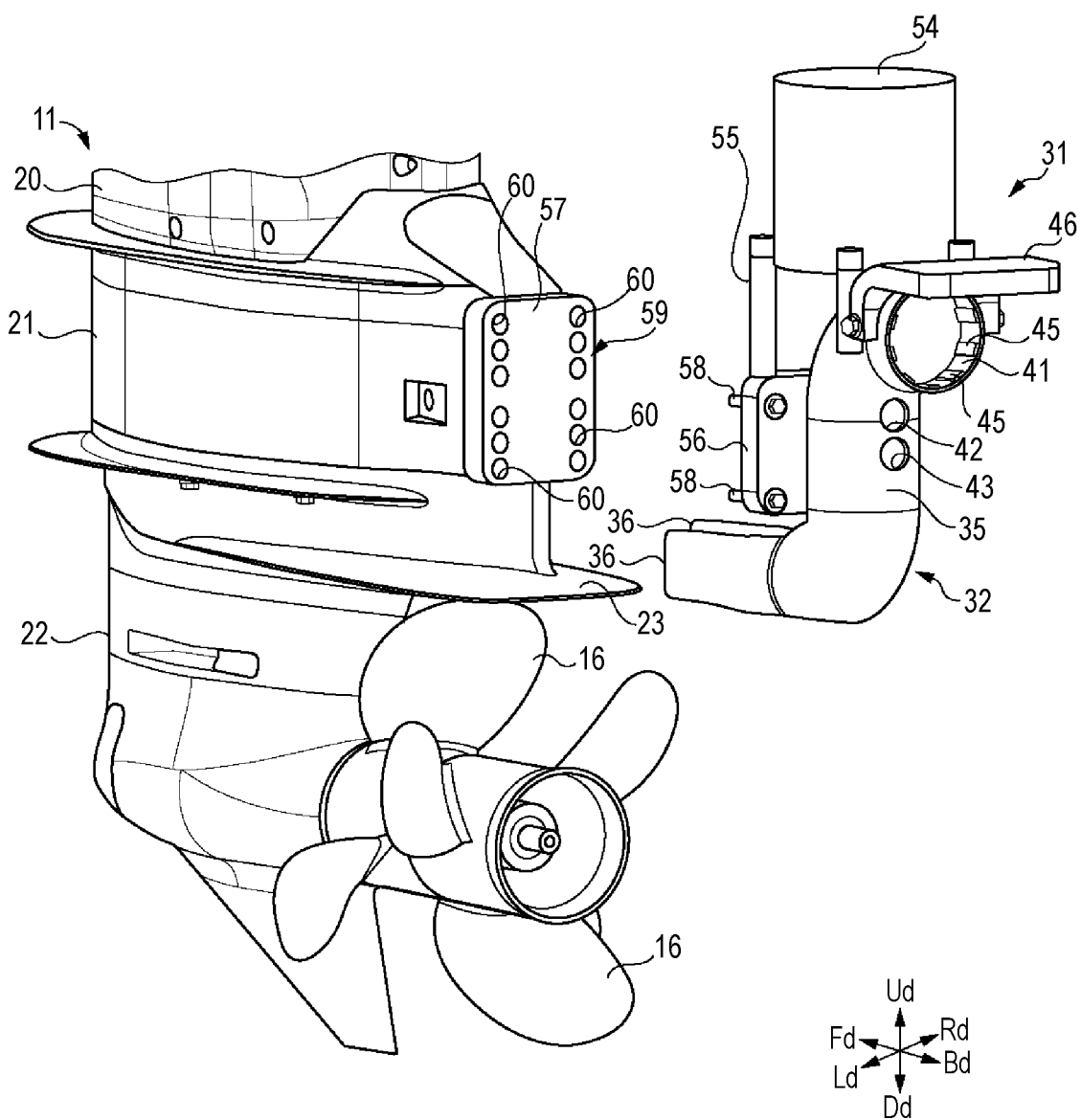
FIG. 6 is an explanatory view showing a structure for attaching the electric propulsion part to an internal-combustion-drive propulsion part in the hybrid outboard motor according to the embodiment of the present invention.

FIG. 6 shows a structure in which the electric propulsion part 31 is attached to the internal-combustion-drive propulsion part 11. As shown in FIG. 6, in the electric propulsion part 31, the attachment bracket 56 is provided in front of the intermediate portion 35 of the duct 32. The attachment bracket 56 is fixed to a front portion in an outer surface of the peripheral wall portion of the intermediate portion 35 of the duct 32. On the other hand, an attachment plate 57 is fixed to the rear portion of the middle case 21 in the internal-combustion-drive propulsion part 11. The electric propulsion part 31 is attached to the rear portion of the middle case 21 by fixing the attachment bracket 56 to the attachment plate 57 using a fixing member 58 (for example, a bolt). According to this attachment structure, the electric propulsion part 31 can be easily externally attached to the internal-combustion-drive propulsion part 11. In addition, according to this attachment structure, the electric propulsion part 31 can be easily attached to and detached from the internal-combustion-drive propulsion part 11. The attachment bracket 56 is a specific example of an "attachment part".

In addition, the attachment plate 57 is provided with an attachment position changing structure 59 capable of changing the attachment position of the electric propulsion part 31 with respect to the internal-combustion-drive propulsion part 11 in the upper-lower direction. Specifically, a plurality of holes 60 (for example, threaded bolt holes) through which the fixing member 58 can be fixed (fastened) are arranged in the upper-lower direction in the attachment plate 57. By selecting a hole for fixing the fixing member 58 from among the plurality of holes 60, the attachment position of the electric propulsion part 31 in the upper-lower direction can be selected. Such an attachment position changing structure may be provided not in the attachment plate 57 but in the attachment bracket 56.

(Control of Outboard Motor)

Figure 7:
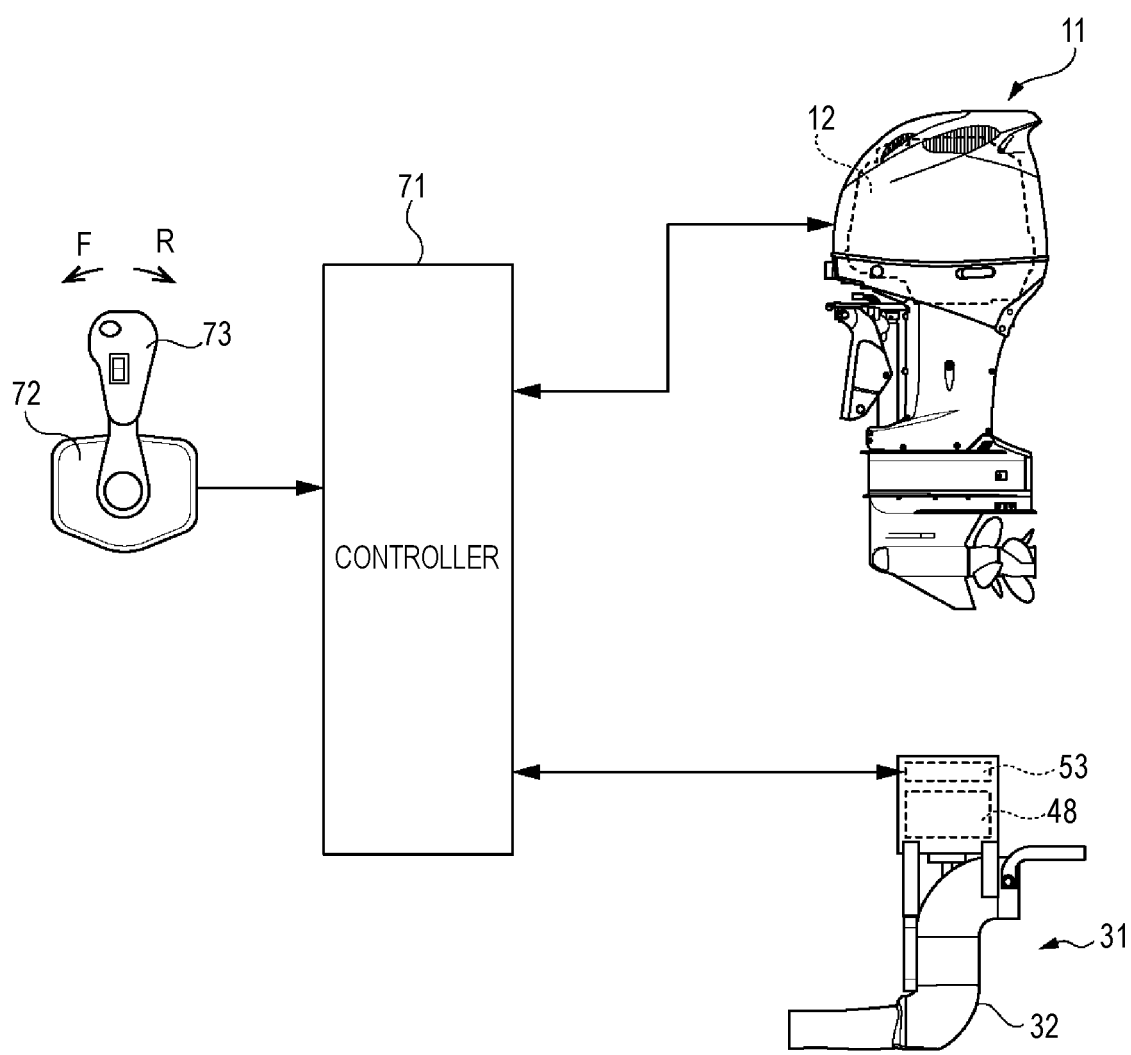
FIG. 7 is an explanatory view showing an electrical configuration of the hybrid outboard motor according to the embodiment of the present invention.

FIG. 7 shows an electrical configuration of the outboard motor 1. For example, a controller 71 is provided at the upper portion of the outboard motor 1. The controller 71 includes a microcomputer and the like. As shown in FIG. 7, a remote controller 72 is connected to an input side of the controller 71. In addition, the internal-combustion-drive propulsion part 11 and the inverter 53 of the electric propulsion part 31 are connected to an output side of the controller 71. The remote controller 72 is provided in the ship.

An operator of the ship operates a lever 73 of the remote controller 72 to tilt the lever 73 in an F direction or an R direction in FIG. 7 to operate the clutch, thereby switching whether to transmit the power of the internal combustion engine 12 to the propeller shaft 15 and switching the rotation direction of the propeller shaft 15. In addition, the operator can increase or decrease the rotation speed of the internal combustion engine 12 by performing the operation of tilting the lever 73 of the remote controller 72 in the F direction or the R direction. In addition, the operator can switch between driving and stopping of the electric motor 48, and increase or decrease the rotation speed of the electric motor 48 by performing the operation of tilting the lever 73 of the remote controller 72 in the F direction or the R direction.

Specifically, when the operator brings the lever 73 of the remote controller 72 into a neutral position (a state in which the lever 73 is not inclined in both the F direction and the R direction), the controller 71 stops the internal combustion engine 12 (or brings the internal combustion engine 12 into an idling state in which the power of the internal combustion engine 12 is not transmitted to the propeller shaft 15), and stops the electric motor 48 of the electric propulsion part 31.

In addition, when the operator tilts the lever 73 of the remote controller 72 slightly in the F direction in order to move the ship forward at an extremely low speed, the controller 71 drives the electric motor 48 of the electric propulsion part 31 to rotate the impeller 49 in the normal direction while maintaining the internal combustion engine 12 in a stopped state (or an idling state). Accordingly, the ship moves forward at an extremely low speed by the propulsive force of the electric propulsion part 31.

In addition, when the operator tilts the lever 73 of the remote controller 72 to a medium degree in the F direction in order to move the ship forward at a low speed, which is not an extremely low speed but does not reach the planing state, the controller 71 operates the internal combustion engine 12 at a low rotation speed, transmits the rotation to the propeller shaft 15 to rotate the propeller 16 in the normal direction, and drives the electric motor 48 of the electric propulsion part 31 to rotate the impeller 49 in the normal direction. Accordingly, the ship moves forward at a low speed by the propulsive force of the internal-combustion-drive propulsion part 11 and the propulsive force of the electric propulsion part 31.

In addition, when the operator largely tilts the lever 73 of the remote controller 72 in the F direction in order to move the ship forward in the planing state, the controller 71 first operates the internal combustion engine 12 at a high rotation speed to rotate the propeller 16 in the normal direction at a high speed, and drives the electric motor 48 of the electric propulsion part 31 to rotate the impeller 49 in the normal direction. Accordingly, the ship is accelerated by the propulsive force of the internal-combustion-drive propulsion part 11 and the propulsive force of the electric propulsion part 31. Then, when the ship reaches the planing state (after the third discharge port 43 comes out of the water surface), the controller 71 recognizes that the ship reaches the planing state based on the speed of the ship, and stops the electric motor 48 while maintaining the operation of the internal combustion engine 12. Accordingly, the ship slides only by the propulsive force of the internal-combustion-drive propulsion part 11.

As described above, in the outboard motor 1 according to the embodiment of the present invention, the electric propulsion part 31 is attached to the rear portion of the middle case 21 in the internal-combustion-drive propulsion part 11, and is disposed at a position higher than the anti-cavitation plate 23 such that each suction port 36 of the duct 32 sinks below the water surface during low-speed movement, which is not a planing state of the ship, and each suction port 36 comes out of the water surface during planing of the ship. By setting the attachment position of the electric propulsion part 31 in this manner, it is possible to reduce the resistance generated by water hitting the electric propulsion part 31 during planing of the ship, and it is possible to prevent the sailing performance of the ship during planing from being lowered by the resistance.

In particular, by disposing each suction port 36 above the anti-cavitation plate 23, it is possible to make each suction port 36 sufficiently comes out of the water surface during planing of the ship. Accordingly, it is possible to prevent an increase in resistance which hinders sailing of the ship and which is caused by a large amount of water flows into the duct 32 from the suction ports 36 during planing.

In addition, the outboard motor 1 of the present embodiment has a configuration in which the electric propulsion part 31 different from the internal-combustion-drive propulsion part 11 is externally attached to the internal-combustion-drive propulsion part 11. Therefore, in the internal-combustion-drive propulsion part 11, a mechanism (the drive shaft 13, the gear mechanism 14, and the propeller shaft 15) for transmitting the power of the internal combustion engine 12 to the propeller 16 and the impeller shaft 50 of the electric propulsion part 31 are provided separately from each other, and are independent from each other. Therefore, according to the outboard motor 1 of the present embodiment, the propulsive force by the internal combustion engine and the propulsive force by the electric motor can be generated without using a complicated mechanism (for example, the mechanism having the automatic centrifugal clutch or a large number of gears as described in Patent Literature 1) that transmits the power of the internal combustion engine and the power of the electric motor to a common drive shaft. Therefore, it is possible to prevent the internal structure of the outboard motor 1 from becoming complicated.

In addition, in the electric propulsion part 31 of the outboard motor 1 of the present embodiment, when the impeller 49 is reversely rotated to generate a jet in the reverse direction, the plate member 46 that guides water into the first discharge port 41 is provided above the first discharge port 41. Therefore, even when the ship moves backward at a low speed, by the plate member 46, water can sufficiently flow into the duct 32 from the first discharge port 41, and the amount of air flowing into the duct 32 can be reduced. Therefore, it is possible to reliably obtain a propulsive force for moving the ship backward.

In addition, the duct 32 of the electric propulsion part 31 of the outboard motor 1 according to the present embodiment includes the second discharge port 42 and the third discharge port 43 arranged in the upper-lower direction in addition to the first discharge port 41. According to this configuration, as described above, it is possible to prevent the propulsive force of the electric propulsion part 31 from significantly decreasing at once at one point in time during the transition of the ship from the low-speed movement state to the planing state, and it is possible to stabilize the sailing of the ship.

In addition, the duct 32 of the electric propulsion part 31 of the outboard motor 1 according to the present embodiment has the two suction ports 36 arranged in the left-right direction. Accordingly, when a jet is generated in the normal direction, water can be efficiently caused to flow into the duct 32 through the two suction ports 36. In addition, since the two suction ports 36 are disposed on the left side and the right side of the middle case 21, respectively, water in the duct 32 can be discharged from the two suction ports 36 in a balanced manner in the left-right direction when a jet in the reverse direction is generated.

In addition, in the outboard motor 1 of the present embodiment, the electric propulsion part 31 is provided with the attachment bracket 56, the internal-combustion-drive propulsion part 11 is provided with the attachment plate 57, and the electric propulsion part 31 is detachably attached to the internal-combustion-drive propulsion part 11 via the attachment bracket 56 and the attachment plate 57. Therefore, the user can easily attach or detach the electric propulsion part 31 to or from the internal-combustion-drive propulsion part 11 according to the use of the outboard motor 1, which is highly convenient. In addition, according to the outboard motor 1 of the present embodiment, the electric propulsion part 31 can be easily externally attached to an existing internal-combustion-driven outboard motor, and the existing internal-combustion-driven outboard motor can be easily hybridized.

In addition, the outboard motor 1 of the present embodiment has the attachment position changing structure 59 capable of changing the attachment position of the electric propulsion part 31 in the upper-lower direction with respect to the internal-combustion-drive propulsion part 11. Accordingly, it is possible to easily adjust the attachment position of the electric propulsion part 31 according to the size of the outboard motor, the number of occupants of the ship, the weight of the cargo, or the draft.

In addition, according to the outboard motor 1 of the present embodiment, the power source, a propulsive force generation part (impeller), and the like include the electric propulsion part 31 independent of the internal-combustion-drive propulsion part 11. Therefore, for example, even when the internal-combustion-drive propulsion part 11 fails and does not operate during sailing, it is possible to bring the ship close to the coast by using the electric propulsion part 31.

In addition, according to the outboard motor 1, since the electric propulsion part 31 is attached to the internal-combustion-drive propulsion part 11, both the propulsive force by the internal combustion engine and the propulsive force by the electric motor can be obtained by attaching the outboard motor 1 to the ship. Therefore, in order to obtain the propulsive force by the internal combustion engine and the propulsive force by the electric motor, it is not necessary to attach the internal-combustion-driven outboard motor and the electric outboard motor to the ship, respectively. Therefore, even when the ship is small in size or even when a plurality of internal-combustion-driven outboard motors are already multi-mounted on the ship, the propulsive force by the internal combustion engine and the propulsive force by the electric motor can be obtained.

In addition, according to the outboard motor 1, a low speed torque before planing can be easily supplemented by the electric propulsion part 31. Accordingly, even if an internal combustion engine with enhanced torque performance in a high rotation speed range is used, a high sailing performance or a good acceleration performance of the ship in a low speed range can be ensured. In addition, since the low-speed movement of the ship can be supplemented by the electric propulsion part 31, by using a propeller for high-speed sailing as the propeller 16 of the internal-combustion-drive propulsion part 11, it is possible to improve the sailing performance in the high speed range without deteriorating the sailing performance in the low speed range. In addition, during the low-speed movement of the ship, the operation of the internal combustion engine 12 is stopped and the ship is moved only by the propulsive force of the electric propulsion part 31, and therefore, the ship can be moved at a low speed without generating noise. In addition, fuel efficiency can be improved by using the internal combustion engine and the electric motor in combination.

In addition, in the outboard motor 1 of the present embodiment, the inverters 53 that controls the driving of the electric motor 48 is provided in the housing case 54 of the electric propulsion part 31. By unitizing the electric motor and the inverter as described above, the electric propulsion part 31 can be easily externally attached to the internal-combustion-drive propulsion part 11.

In addition, in FIG. 7, transmission and reception of control signals and the like between the controller 71 and the inverter 53 may be performed wirelessly. Accordingly, since a cable for transmitting and receiving the control signal and the like between the controller 71 and the inverter 53 does not need to be wired, the electric propulsion part 31 can be more easily attached to and detached from the internal-combustion-drive propulsion part 11.

In the above embodiment, the case where the electric propulsion part 31 is attached to the rear portion of the middle case 21 of the internal-combustion-drive propulsion part 11 has been described as an example. However, the position at which the electric propulsion part 31 is attached is a position higher than the anti-cavitation plate in any portion of the middle case 21, the gear case 22, and the upper case 20, and is not limited to the rear portion of the middle case 21 as long as each suction port 36 of the duct 32 sinks below the water surface during low-speed movement, which is not a planing state of the ship, and each suction port 36 comes out of the water surface during planing of the ship. The present invention also includes a configuration in which the electric propulsion part 31 is attached to a portion of a frame or a bracket that supports the middle case 21 and the like in the outboard motor 1.

In addition, in the above embodiment, the duct 32 has the two suction ports 36, but the number of suction ports may be one, or three or more. In the above embodiment, although the three discharge ports 41, 42, and 43 are provided, the number of discharge ports may be one, or four or more. In the above embodiment, the duct 32 is formed in an S-shape, but the shape of the duct is not limited thereto. In addition, a plurality of electric propulsion parts may be attached to the internal-combustion-drive propulsion part 11.

Figure 8:
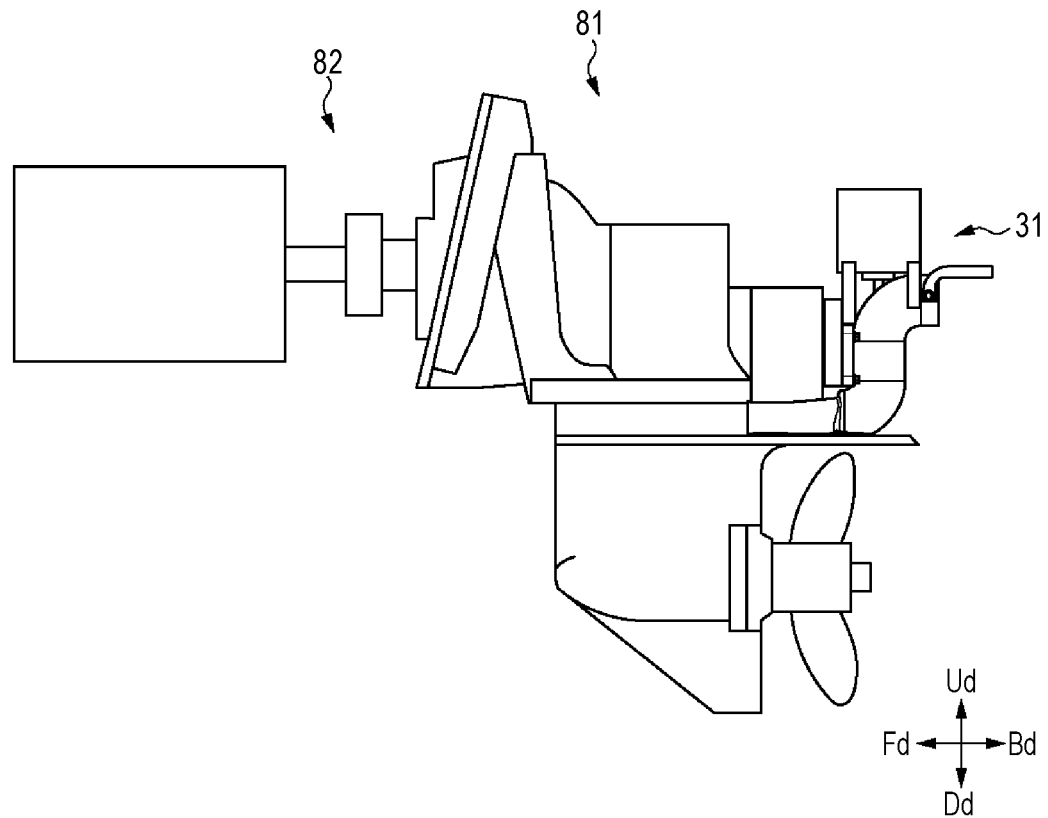
FIG. 8 is an explanatory view showing a hybrid inboard-outboard motor, which is another embodiment of the hybrid ship propulsion machine of the present invention.

In addition, the present invention is not limited to the outboard motor, and may be applied to an inboard-outboard motor. Specifically, as shown in FIG. 8, the electric propulsion part 31 may be attached to an internal-combustion-driven inboard-outboard motor 82. Accordingly, a hybrid inboard-outboard motor 81 can be configured.

Figure 9:
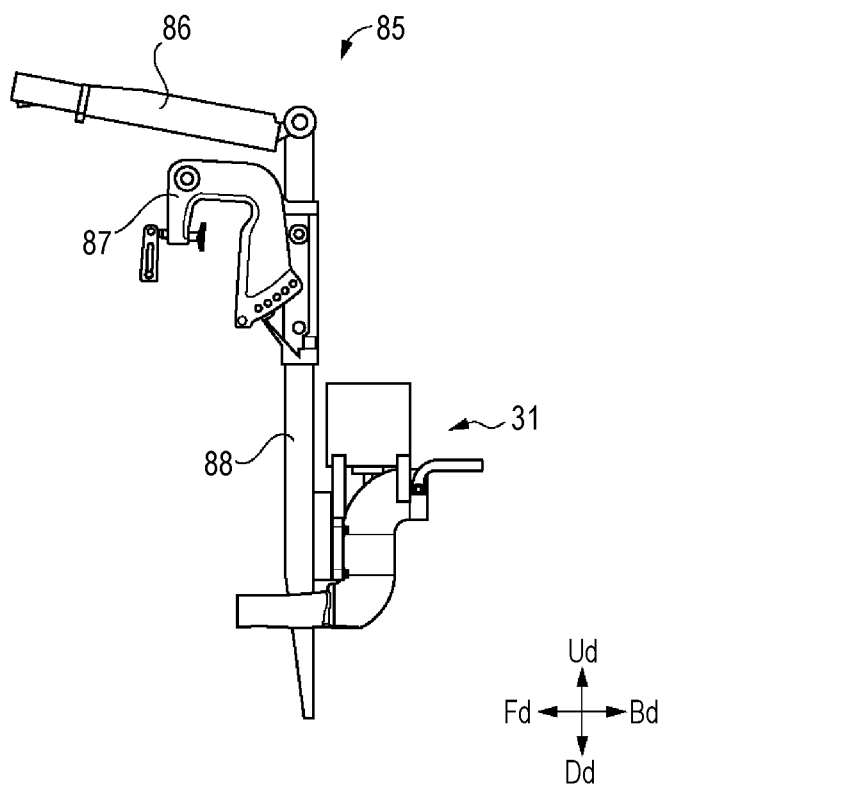
FIG. 9 is an explanatory view showing an electric outboard motor using the electric propulsion part according to the embodiment of the present invention.

In addition, as shown in FIG. 9, an electric outboard motor 85 can be formed by attaching the electric propulsion part 31 to a frame 88 including a handlebar 86 and a clamp bracket 87.

In addition, the present invention can be modified as appropriate without departing from the scope or spirit of the invention which can be read from the claims and the entire specification, and the hybrid ship propulsion machine to which such a change is applied is also included in the technical concept of the present invention.

What is claimed is:

1. A hybrid ship propulsion machine comprising:
an internal-combustion-drive propulsion part configured to generate a propulsive force of a ship by an internal combustion engine; and
an electric propulsion part configured to generate a propulsive force of the ship by an electric motor, wherein
the internal-combustion-drive propulsion part includes
the internal combustion engine;
a propeller shaft configured to be rotated by power output from the internal combustion engine;
a power transmission mechanism configured to transmit the power output from the internal combustion engine to the propeller shaft;
a first housing part housing the power transmission mechanism and the propeller shaft;
a propeller attached to the propeller shaft; and
an anti-cavitation plate provided in the first housing part and is disposed above the propeller,
the electric propulsion part includes
a duct in which a suction port through which water is sucked is provided on one end side and a discharge port through which water sucked from the suction port is discharged is provided on the other end side;
the electric motor;
a second housing part attached to the duct and houses the electric motor;
an impeller provided in the duct and is configured to generate a jet; and
an impeller shaft configured to transmit power output from the electric motor to the impeller to rotate the impeller, and
the electric propulsion part is attached to the first housing part, and is disposed at a position higher than the anti-cavitation plate such that the suction port sinks below a water surface during low-speed movement, which is not a planing state of the ship, and the suction port comes out of the water surface during planing of the ship.

2. The hybrid ship propulsion machine according to claim 1, wherein
the suction port is disposed above the anti-cavitation plate.

3. The hybrid ship propulsion machine according to claim 1, wherein
a plate member is provided above the discharge port, and
the plate member is configured to guide water into the discharge port when the impeller is reversely rotated to generate a jet in a reverse direction.

4. The hybrid ship propulsion machine according to claim 1, wherein
the discharge port includes a plurality of discharge ports
the plurality of discharge ports are provided on the other end side of the duct so as to be arranged in an upper-lower direction.

5. The hybrid ship propulsion machine according to claim 1, wherein
the electric propulsion part includes an attachment part attaching the electric propulsion part to the first housing part, and
the electric propulsion part is detachably attached to the first housing part via the attachment part.

6. The hybrid ship propulsion machine according to claim 5, wherein
the first housing part or the attachment part has an attachment position changing structure configured to be capable of changing an attachment position of the electric propulsion part with respect to the internal-combustion-drive propulsion part in the upper-lower direction.

7. The hybrid ship propulsion machine according to any one of claim 1, wherein
an inverter configured to control driving of the electric motor is provided in the second housing part.

* * * * *